United States Patent
Matsumiya et al.

(10) Patent No.: US 10,551,184 B2
(45) Date of Patent: Feb. 4, 2020

(54) MEASURING HEAD

(71) Applicant: MITUTOYO CORPORATION, Kanagawa (JP)

(72) Inventors: Sadayuki Matsumiya, Kanagawa (JP); Tomoyuki Miyazaki, Kanagawa (JP); Shuichi Kamiyama, Kanagawa (JP); Hideyuki Arai, Tokyo (JP)

(73) Assignee: MITUTOYO CORPORATION, Kanagawa (JP)

( * ) Notice: Subject to any disclaimer, the term of this patent is extended or adjusted under 35 U.S.C. 154(b) by 125 days.

(21) Appl. No.: 15/933,840

(22) Filed: Mar. 23, 2018

(65) Prior Publication Data
US 2018/0274914 A1  Sep. 27, 2018

(30) Foreign Application Priority Data
Mar. 27, 2017 (JP) .................. 2017-061952

(51) Int. Cl.
*G01B 21/06* (2006.01)
*G01B 5/008* (2006.01)
*G01B 13/03* (2006.01)
*G01B 21/04* (2006.01)
*G05D 16/00* (2006.01)
*G01B 9/02* (2006.01)

(52) U.S. Cl.
CPC ............ *G01B 21/06* (2013.01); *G01B 5/008* (2013.01); *G01B 13/03* (2013.01); *G01B 21/047* (2013.01); *G05D 16/00* (2013.01); *G01B 9/0205* (2013.01)

(58) Field of Classification Search
CPC .......... G01B 5/008; G01B 5/016; G01B 5/20; G01B 21/047; G01B 21/06

USPC ......................................................... 33/503
See application file for complete search history.

(56) References Cited

U.S. PATENT DOCUMENTS

| 7,395,607 B1* | 7/2008 | Broderick | B25J 7/00 33/503 |
|---|---|---|---|
| 2005/0022409 A1* | 2/2005 | Yamamoto | F16F 7/10 33/558 |
| 2008/0127501 A1* | 6/2008 | Eaton | G01B 21/047 33/503 |
| 2010/0269361 A1 | 10/2010 | Matsumiya et al. | |
| 2010/0293800 A1* | 11/2010 | Nakayama | G01B 5/201 33/558 |
| 2011/0254496 A1* | 10/2011 | Barkman | B23Q 17/20 318/561 |

(Continued)

FOREIGN PATENT DOCUMENTS

JP    2010-256121 A    11/2010

*Primary Examiner* — Yaritza Guadalupe-McCall
(74) *Attorney, Agent, or Firm* — Greenblum & Bernstein, P.L.C.

(57) ABSTRACT

A measuring head includes a first slide mechanism for a first measurement axis provided to be detachable to external moving devices; a second slide mechanism for a second measurement axis held to be movable by the first slide mechanism; a third slide mechanism for a third measurement axis held to be movable by the second slide mechanism; a probe held to be movable by the third slide mechanism; pneumatic cylinders for connecting slider parts and guide parts included in each slide mechanism; and automatic pressure regulators for respectively changing air pressures supplied to each pneumatic cylinder in accordance with measurement postures of the measuring head.

4 Claims, 6 Drawing Sheets

(56) References Cited

U.S. PATENT DOCUMENTS

| | | | |
|---|---|---|---|
| 2018/0023936 A1* | 1/2018 | Arai | G01B 5/0007 |
| | | | 33/503 |
| 2018/0202803 A1* | 7/2018 | Ziegenbein | G01B 5/008 |
| 2018/0259552 A1* | 9/2018 | Kobayashi | G01Q 10/04 |
| 2018/0274914 A1* | 9/2018 | Matsumiya | G01B 21/06 |

* cited by examiner

MEASURING HEAD

RELATED APPLICATIONS

This application claims the priority of Japanese Patent Application No. 2017-061952 filed on Mar. 27, 2017, which is incorporated herein by reference.

FIELD OF THE INVENTION

The present invention relates to a measuring head for measuring a work surface as an object to be measured, and more particularly to an improvement of an auxiliary mechanism for a motor power installed in the measuring head.

BACKGROUND OF THE INVENTION

A three-dimensional measuring machine suitable for measuring a work including both of a measurement area which requires high precision and a measurement area which may be measured with relatively low precision within the surface shape of a work is known (refer to Patent Literature 1). The Patent Literature 1 shows a combination of a bridge-type CNC three-dimensional coordinate measuring machine and a measuring head provided to be movable in three directions of the measuring machine by the measuring machine.

Figure 7:
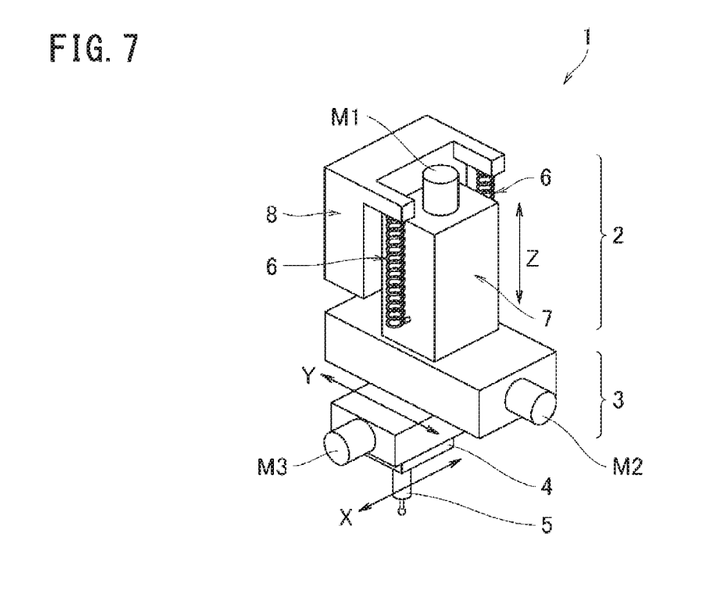
FIG. 7 is a three-dimensional view showing a structure of a conventional measuring head.

The bridge-type three-dimensional measuring machine generally comprises a base, an X-axis table provided to be movable on the upper face of the base in a horizontal direction, a column erected on the base, a beam supported by the column, a Y-axis slider provided to be movable along the beam, a Z-axis slider provided to be liftable along a guide of the Y-axis slider, and a spindle connected to the Z-axis slider. Patent Literature 1 is characterized in that a measuring head is mounted at the tip of the spindle. As shown in FIG. 7, the measuring head 1 comprises a Z-axis slide mechanism 2 detachably provided at the tip of a spindle of the three-dimensional measuring machine, a Y-axis slide mechanism 3 supported by the Z-axis slide mechanism 2 to be movable in Z-axis direction, an X-axis slide mechanism 4 supported to be movable by the Y-axis slide mechanism 3 in Y-axis direction, and a probe 5 supported to be movable by the X-axis slide mechanism 4 in the X-axis direction.

According to Patent Literature 1, the drive mechanisms 2, 3 and 4 of the measuring head 1 moves the probe 5, so that a highly precise measurement is performed in a small measurement area. Further, the drive mechanism of the three-dimensional measuring machine moves the measuring head 1, so that a measurement of low to medium level precision is smoothly performed in a large measurement area.

PRIOR ART LITERATURES

Patent Literature

PATENT LITERATURE 1: Japanese Unexamined Patent Application Publication No. 2010-256121

DISCLOSURE OF THE INVENTION

Problem to be Solved by the Invention

As shown in FIG. 7, a spring 6 which extends and contracts in approximate vertical direction is provided to the Z-axis slide mechanism 2 of the conventional measuring head 1, and connects a slider 7 and a guide 8. When an electrical motor M1, which is a power source of the Z-axis slide mechanism, lifts the slider 7, the spring 6 reduces the load to the motor to enhance motor drive performance (positioning, constant velocity, high speed movement, and the like) in vertical direction. It is referred to as an auxiliary mechanism for a motor power herein.

However, the auxiliary mechanism for the motor power comprised of springs in FIG. 7 does not function appropriately unless the posture of the measuring head 1 is determined so that the moving direction of the Z-axis slider 7 is approximately vertical. Further, the same posture of the measuring head 1 needs to be kept during measurement. This is because, if a measurement posture is changed, loads of the drive motors M2, M3 of the Y- or X-axis slide mechanism change, and drive performance of each motor cannot maintained. Further, to maintain drive performance, gain adjustments of each motor have to be done for each change in posture.

Limitations in measurement postures are necessary not only for measuring heads used like Patent Literature 1, but also for measuring heads mounted onto any kind of moving devices in general. The inventors diligently investigated to eliminate such limitations of measurement postures.

The object of the present invention is to improve the auxiliary mechanism for the motor power for driving installed to conventional measuring heads, and to provide a measuring head that exhibits motor drive property which does not depend on measurement postures and can measure in any posture.

Means to Solve the Problem

To solve the above-mentioned object, the measuring heads 10, 10A of the present invention comprise:

a first slide mechanism 50 having a first slider 51, a first guide 52 for guiding the first slider 51, and a first motor 53 for driving the first slider 51 for sliding along a first measurement axis;

a second slide mechanism 60 having a second slider 61, a second guide 62 fixed to the first slider 51 for guiding the second slider 61, and a second motor 63 for driving the second slider 61 for sliding along a second measurement axis which is not parallel to the first measurement axis; and a probe 20 held by the second slider 61 for detecting a work;

and make the probe 20 to detect a work surface in accordance with the movement of the respective sliders 51, 61.

The measuring heads 10, 10A are detachable to any external moving device 100, 200 via the first guide 52.

The first slide mechanism 50 has a first fluid pressure cylinder 55 which connects the first slider 51 and the first guide 52 and can extend and contract in the first measurement axis direction, and a first fluid pressure changer 57 for changing pressure of fluid provided to the first fluid pressure cylinder 55 in accordance with a measurement posture of the measuring heads 10, 10A.

The second slide mechanism 60 has a second fluid pressure cylinder 65 which connects the second slider 61 and the second guide 62 and can extend and contract in the second measurement axis direction, and a second fluid pressure changer 67 for changing pressure of fluid provided to the second fluid pressure cylinder 65 in accordance with a measurement posture of the measuring heads 10, 10A.

Action of the measuring head of the present invention will be described. The measuring head is mounted onto a bridge-type three-dimensional measuring machine (shown in FIG. 2), an articulated moving device (shown in FIG. 5) and the like. Owing to such external moving devices, the probe slides in each measurement axis direction to detect the work surface in a state which the measurement posture of the measuring head is freely set and the measuring head has moved to a desired position. The measuring head obtains positional information of the work surface based on a displacement of the slider of each measurement axis of when the work surface is detected. It is preferable that the measurement axis of the measuring head is two or more. For example, in a method of which the probe approaches to or separates from the work along the first measurement axis and the prove moves to a next measurement position along the second measurement axis, measurement is possible by moving the probe only without changing the position and posture of the measuring head held by the external moving device.

The measuring head of the present invention has a fluid pressure cylinder for each measurement axis and a changer for its fluid pressure, and individually changes the fluid pressure to the first and the second fluid pressure cylinder in accordance with the measurement posture of the measuring head (for example, an angle of inclination of each measurement axis which has vertical downward direction as a standard direction). The fluid pressure cylinder is a fluid-pressure cylindrical actuator. The first fluid pressure cylinder urges the first slider by a power based on the fluid pressure adjusted by the first fluid pressure changer. In other words, the first fluid pressure cylinder pushes or pulls the first slider. It is preferable that the magnitude of the urging force corresponds to the component force in the first measurement axis direction of the gravity which acts on the first slider. Similarly, the second fluid pressure cylinder urges the second slider by a power based on the fluid pressure adjusted by the second fluid pressure changer. It is preferable that the magnitude of the urging force corresponds to the component force in the second measurement axis direction of gravity which acts on the second slider.

The effects of the present invention are described. In the measuring head which moves the probe by a plurality of sliders in each measurement axis direction, the effect of gravity which acts on each slider greatly changes in accordance with its measurement posture. Accordingly, the measuring head of the present invention changes the urging force of each fluid pressure cylinder in accordance with measurement postures, and adds urging forces to each slider individually adjusted for each slider. As a result, variations of motor load due to the change of measurement posture can be suppressed to zero or extremely small, so that drive performance of the motor independent of measurement postures can be exhibited. Thus, a measuring head capable of taking any measurement posture without deteriorating its performance and function can be provided.

It is preferable that the measuring heads 10, 10A of the present invention further comprises a posture detector 80 for detecting measurement postures of the measuring heads 10, 10A, wherein each of the fluid pressure changers 57, 67 changes pressure of the fluid based on posture information from the posture detector 80. As a method for posture detection, a sensor for detecting vertical direction is fixed onto the measuring head to determine the posture of the measuring head from its detection value, for example. A camera for imaging a reference mark may be fixed onto the measuring head and process the image data of the mark to determine the posture of the measuring head.

In the measuring heads 10, 10A of the present invention, it is preferable that a third slide mechanism 70 for a third measurement axis that is not parallel to the first and the second measurement axis is provided between the second slider 61 and the probe 20.

The third slide mechanism 70 has a third slider 71 for holding the probe 20, a third guide fixed to the second slider 61 for guiding the third slider 71, a third motor 73 for driving the third slider 71, a third fluid pressure cylinder 75 which connects the third slider 71 and the third guide and can extend and contract in the third measurement axis direction, and a third fluid pressure changer 77 for changing pressure of the fluid provided to the third fluid pressure cylinder 75 in accordance with the measurement posture of the measuring heads 10, 10A.

When measurement axes of the probe are provided in three directions like this configuration, an auxiliary mechanism for the motor power in the third measurement axis may be provided like in the configuration of the other two directions.

As described above, according to the present invention, the measuring head which can exhibit motor drive property independent of measurement postures can be provided. In other words, a measuring head capable of taking any measurement posture without deteriorating its performance and function can be provided. Further, a measuring head having two or more different measurement axes can be applied to various types of moving devices such as an articulated moving device, a bridge-type three-dimensional measuring machine, and the like, and use of measuring heads will be expanded.

BEST MODE FOR CARRYING OUT THE INVENTION

The measuring head according to a first embodiment of the present invention will be described with reference to the drawings.

Figure 1:
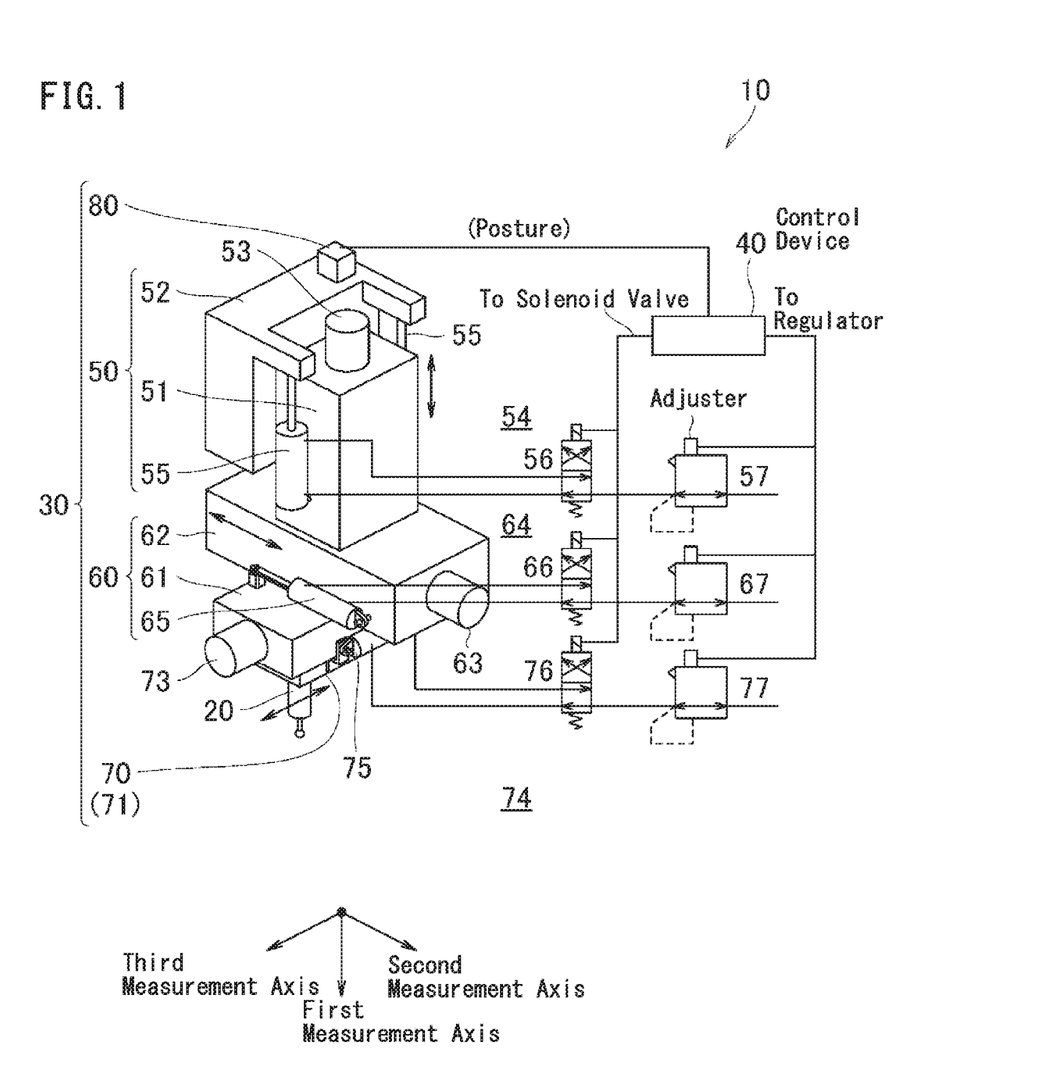
FIG. 1 is a three-dimensional view showing a whole configuration of the measuring head according to a first embodiment of the present invention.

FIG. 1 is a three-dimensional view of a measuring head 10 according to the present invention together with a control block diagram of its auxiliary mechanism. The measuring head 10 comprises a probe 20, a driving device 30 for the probe 20, and a control device 40, and is held to an external moving device. The measuring head 10 detects a work surface by movement of the probe 20 accompanied by the probe driving device 30 while being held by the external moving device.

The probe driving device 30 comprises each slide mechanism 50, 60, 70 for a first, second and third measurement axis systems, and a posture detector 80. The first, second and third measurement axes are three axes that are not parallel to each other and are intrinsic axes of the measuring head 10. Thus, the crossing angles between vertically downwards direction and each measurement axis vary in accordance with the posture of the measuring head 10. The three measurement axes that perpendicularly cross each other are used in the description below.

The slide mechanism 50 of the first measurement axis system has a first slider 51, a guide 52 for guiding the first slider 51, a first motor 53 for driving the first slider 51, a first auxiliary mechanism 54 for the motor power, and a scale sensor for the first measurement axis. A ball screw driven by the first motor 53 is installed to the first slider 51. The guide 52 is provided behind the first slider 51. A slide face for the first slider 51 is formed on the front face of the guide 52 (the face opposing to the first slider 51). Consequently, the first slider 51 is slidable along the front face of the guide 52 in the first measurement axis direction. Further, the back face of the guide 52 is a detachable portion. In the detachable portion, a jig for attaching and detaching the measuring head 10 to the external moving device is formed.

The slide mechanism 60 for the second measurement axis system is related to the second measurement axis that perpendicularly crosses the first measurement axis, and is provided below the slide mechanism 50 for the first measurement axis system. The slide mechanism 60 has a second slider 61, a guide 62 for guiding the second slider 61, a second motor 63 for driving the second slider 61, a second auxiliary mechanism 64 for the motor power, and a scale sensor for the second measurement axis. The second guide 62 is fixed to the lower face of the first slider 51. The second slider 61 is provided to the lower face of the second guide 62. The second slider 61 is slidable along the lower face of the second guide 62 in the second measurement axis direction.

The slide mechanism 70 for the third measurement axis system is related to the third measurement axis that perpendicularly crosses both of the first and second measurement axes, and is provided below the slide mechanism 60 for the second measurement axis system. The slide mechanism 70 has a third slider 71, a guide for guiding the third slider 71 (integrally formed with the second slider 61), a third motor 73 for driving the third slider 71, a third auxiliary mechanism 74 for the motor power, and a scale sensor for the third measurement axis. The third slider 71 is provided on the lower face of the second slider 61, and is slidable along the lower face of the second slider 61 in the third measurement axis direction.

Hereinbelow, auxiliary mechanisms 54, 64 and 74 for the motor power that are characteristic to the present invention will be described in detail.

The first auxiliary mechanism 54 comprises a first pneumatic cylinder 55 (corresponds to a fluid pressure cylinder), a first automatic pressure regulator 57 (corresponds to a fluid pressure changer), a first electromagnetic switching valve 56 (corresponds to a flow path switcher). A pair of the first pneumatic cylinders 55 is arranged to be extendable and contractible in the first measurement axis direction, and connects the first slider 51 and the first guide 52. Two of the first pneumatic cylinders 55 are arranged to interpose the first slider 51. The tips of the first pneumatic cylinders at the rod side are fixed to arm parts extending from the first guide 52, and the tips opposite to the rod side are fixed to the side parts of the first slider 51.

A posture detector 80 for detecting the measurement posture of the measuring head 10 is mounted to the first guide 52. The posture detector 80 sends detection signals to the control device 40, and the control device 40 determines the posture of the measuring head 10. The first automatic pressure regulator 57 changes air pressure supplied to the first pneumatic cylinder 55 based on a pressure command value from the control device 40. The first automatic pressure regulator 57 may be one which comprises a diaphragm type pressure regulating mechanism, for example. Rotation power of the installed electric motor changes in accordance with the command value, and pushing force towards the diaphragm is adjusted. In particular, a regulator with a check valve is preferable. The check valve releases back pressure which occurs at a secondary side of the first automatic pressure regulator 57 when the slider 51 is moved by the motor power in a direction opposite to the direction which the slider 51 is moved by the urging force of the first pneumatic cylinder 55, so that movement can be performed smoothly.

The first electromagnetic switching valve 56 can select supply destination for compressed air from the first automatic pressure regulator 57. That is, the first electromagnetic switching valve 56 function as a flow path switcher for switching supply destination from either one of a supply port at the rod side and a supply port at the counter rod side of the first pneumatic cylinder 55 to another. A three port, two position single solenoid typed electromagnetic switching valve is shown in FIG. 1 as one example. When the solenoid is not excited like in FIG. 1, a spool maintains a first position by spring force, and compressed air is sent to the supply port at the counter rod side of the cylinder 55. The supply port at the rod side of the cylinder 55 becomes open. On the other hand, when the solenoid is excited, the spool maintains a second position, and compressed air from the first automatic pressure regulator 57 is sent to the supply port at the rod side of the cylinder 55. The supply port at the counter rod side of the cylinder 55 becomes open.

The first electromagnetic switching valve 56 switches air supply destination when measurement posture of the measuring head 10 is changed, or to be more specific, when the direction of the first measurement axis changes over the horizontal direction (for example, when the positive direction of the first measurement axis changes from downward state lower than the horizontal direction to upward state).

The second auxiliary mechanism 64 comprises a second pneumatic cylinder 65, a second electromagnetic switching valve 66, and a second automatic pressure regulator 67. A pair of the second pneumatic cylinders 65 is arranged to be extendable and contractible in the second measurement axis direction, and connects the second slider 61 and the second guide 62. Two of the second pneumatic cylinders 65 are arranged to interpose the second guide 62. The tips of the pneumatic cylinders 65 at the rod side are fixed to the upper face of the second slider 61, and the tips at the counter rod side are fixed to side parts of the second guide 62.

The second automatic pressure regulator 67 changes air pressure supplied to the second pneumatic cylinder 65 based on posture information from the posture detector 80. The second electromagnetic switching valve 66 switches supply destination of air from the second automatic pressure regulator 67 from either one of a supply port at the rod side of the pneumatic cylinder 65 and a supply port at the counter rod side of the pneumatic cylinder 65 to the other.

The third auxiliary mechanism 74 comprises a third pneumatic cylinder 75, a third electromagnetic switching valve 76, and a third automatic pressure regulator 77. A pair of the third pneumatic cylinders 75 is arranged to be extendable and contractible in the third measurement axis direction, and connects the third slider 71 and the third guide (the same as the second slider 61). Two of the third pneumatic cylinders 75 are arranged to interpose the second slider 61. The tips of the pneumatic cylinders 75 at the rod side are fixed to the side face of the second slider 61, and the tips at the counter rod side are fixed to side parts of the third slider 71.

The third automatic pressure regulator 77 changes air pressure supplied to the third pneumatic cylinder 75 like the first and the second automatic pressure regulators. The third electromagnetic switching valve 76 switches supply destination of air from the third automatic pressure regulator 77 from either one of a supply port at the rod side and a supply port at the counter rod side of the pneumatic cylinder 75 to the other.

The probe 20 comprises a stick-shaped stylus having a touch portion at the tip, and a cylindrical support portion supporting this stylus. The support portion of the stylus is held by the third slider 71.

The control device 40 of the measuring head 10 determines the posture of the measuring head 10 based on the signals from the posture detector 80, and sends command values of air pressure to respective regulators 57, 67, and 77 based on the posture. Further, the control device 40 sends command values of selected flow paths to the electromagnetic switching valves 56, 66, and 76 based on the posture of the measuring head 10. This control device 40 may be installed to control devices of external moving devices such as a three-dimensional measuring machine.

Figure 2:
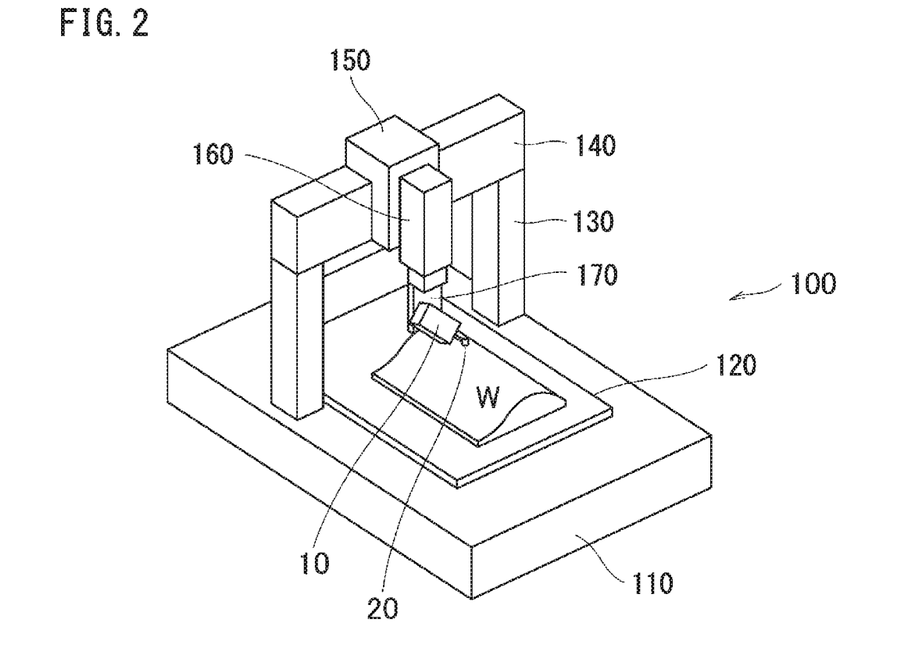
FIG. 2 shows an embodiment of which the measuring head is used in a bridge-type three-dimensional measuring machine.

A use example of the measuring head 10 is shown in FIG. 2. The measuring head 10 is mounted to a spindle 170 of a CNC three-dimensional coordinate measuring machine 100 in a free posture. The three-dimensional measuring machine 100 respectively moves an X-axis table 120, a Y- and Z-axis sliders 150 and 160 to move the measuring head 10 to a desired position. Scale sensors (distinguished from the scale sensor installed inside the measuring head 10) provided to each moving axes (X-, Y-, and Z-axis) of the three-dimensional measuring machine 100 detect position information of the X-axis table 120, the Y-axis slider 150, and the Z-axis slider 160, and send the position information to a control device of the three-dimensional measuring machine 100. The control device obtains position coordinates of the measuring head 10 from those detected values.

Then, the measuring head 10 slides the probe 20 respectively in the first, second and third measurement axes to detect a work surface W. Each scale sensor reads displacement of each slider 51, 61, and 71 of the measuring head 10 when the work surface is detected, and sends them to the control device of the measuring machine 100. The control device obtains position coordinates of the work surface from the respective read-out values of the position coordinate of the measuring head 10 from the three-dimensional measuring machine 100, and the position information of the probe 20 from the measuring head 10.

The work surface is detected by moving the probe driving device 30 of the measuring head 10 only, for example, by moving the probe 20 closer to the work W in a first process. The probe 20 is separated therefrom, and is moved to a next measuring position in a second process. Then, the work surface is detected like in the first process. Owing to such processes, coordinate measurement of the work surface is possible only by a moving the probe 20 of the measuring head 10 without changing the position or posture of the measuring head 10 held by the spindle 170 of the three-dimensional measuring machine 100.

The measurement posture of the measuring head 10 is determined by the control device 40 based on detection signals from the posture detector 80. The control device 40 reads out pressure command values of each automatic pressure regulator 57, 67, and 77 in accordance with the measurement posture from a table data and the like, and sends command values to the regulator. Upon receiving pressure command values from the control device 40, each automatic pressure regulator 57, 67, and 77 changes rotation force of the installed electric motor, and individually adjusts pressure supplied to pneumatic cylinder to be connected. Further, the control device 40 selects flow paths of compressed air in accordance with the measurement posture, and sends command values for switching to the flow paths to the electromagnetic switching valves 56, 66, and 76.

The first pneumatic cylinder 55 urges the first slider 51 by air pressure adjusted by the first automatic pressure regulator 57. In other words, the first pneumatic cylinder 55 pushes or pulls the first slider 51. The command value of air pressure towards the first measurement axis system is set so that the urging force of the first pneumatic cylinder 55 corresponds to a component force in the first measurement axis direction of gravity which acts on the first slider 51. The command value of air pressure towards the second measurement axis system is set so that the urging force of the second pneumatic cylinder 65 corresponds to a component force in the second measurement axis direction of gravity which acts on the second slider 61. Similarly, the command value of air pressure towards the third measurement axis is set so that the urging force of the third pneumatic cylinder 75 corresponds to a component force in the third measurement axis direction of gravity which acts on the third slider 71.

Figure 3:
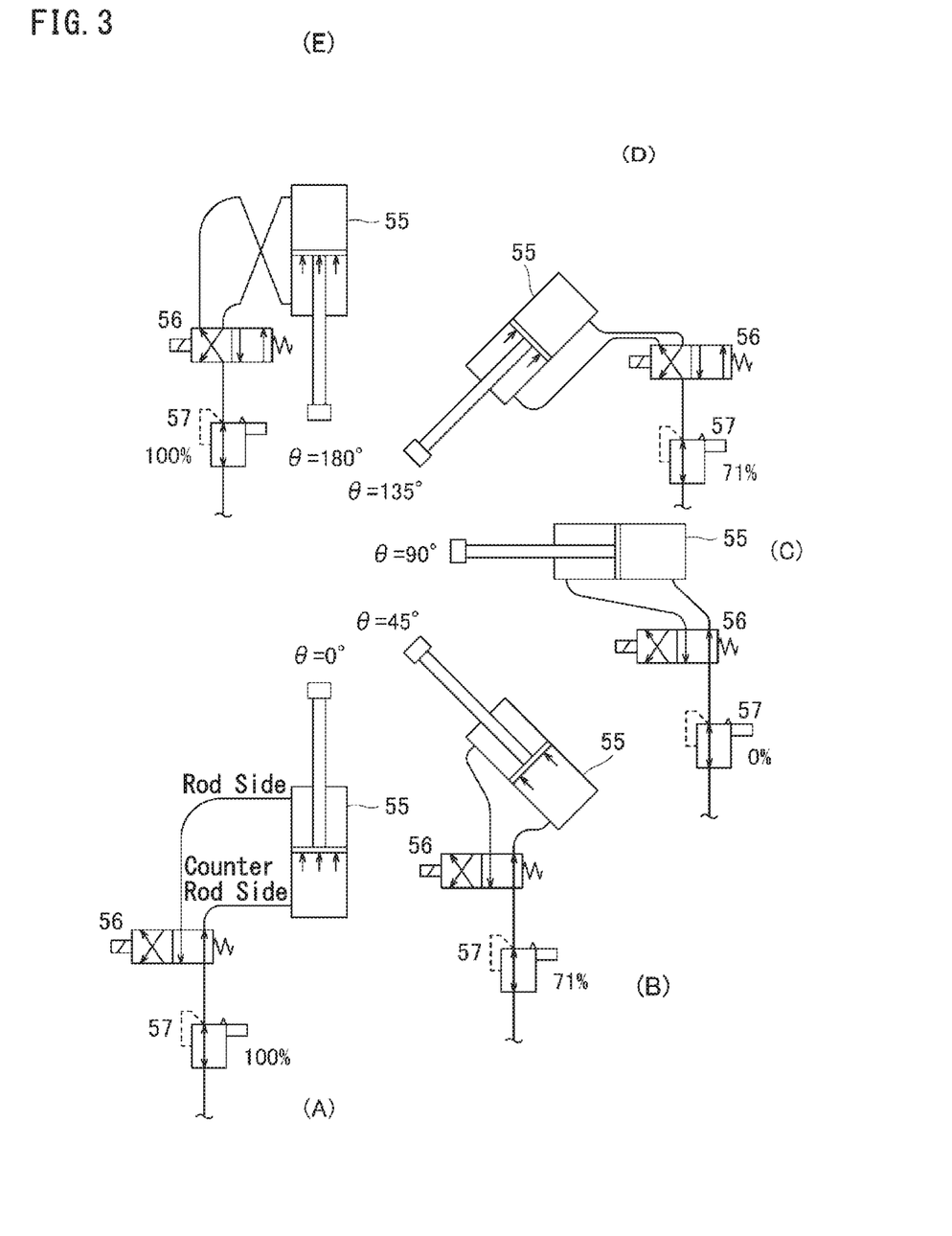
FIG. 3 is a diagram to describe operations of automatic pressure regulators and flow path switching valves in accordance with postures of the measuring head.

In the control device 40, for example, a table data of measurement postures and air pressure set in a relation shown in FIG. 3 is stored. In here, measurement postures are shown by using angles of inclination θ1, θ2, and θ3 of the first, second, and third measurement axes relative to the vertically downward direction. Positive directions of each measurement axis are set to a direction looking from the rod side to the counter rod side of the pneumatic cylinder 55 (refer to the coordinate axis in FIG. 1).

The first pneumatic cylinder 55 of the first measurement axis is focused to describe.

When the angle of inclination is θ=0° (the first measurement axis is the vertically downwards direction), air pressure is at maximum (100%), and the supply destination is the counter rod side. Refer to FIG. 3(A).

When the angle of inclination is θ=45°, air pressure is 71%, and the supply destination is the counter rod side. Refer to FIG. 3(B).

When the angle of inclination is θ=90° (horizontal), air pressure is at minimum (0%), and the supply destination may be either. However, in this case, a preceding state (for example, the counter rod side) is maintained. Refer to FIG. 3(C).

When the angle of inclination is θ=135°, air pressure is 71%, and the supply destination is the rod side. Refer to FIG. 3(D).

When the angle of inclination is θ=180° (vertically upwards direction), air pressure is at maximum (100%), and the supply destination is the rod side. Refer to FIG. 3(E).

The first electromagnetic switching valve 56 operates in the following way in accordance with the change of the first measurement axis direction, for example. When the first measurement axis becomes horizontal (θ=90°) like in FIG. 3(C), the flow path in the preceding state of inclination is maintained. When the first measurement axis exceeds the horizontal state and becomes inclined to the opposite direction (when inclination of θ<90° is changed to θ>90°, or when inclination of θ>90° is changed to θ<90°), the supply destination, i.e. the flow path, is switched.

Effects of the measuring head 10 of the present embodiment is described below.

(1) Effects of gravity acting on each slider 51, 61, and 71 largely changes in accordance with measurement postures. However, in the configuration of the measuring head 10, urging forces of each pneumatic cylinder 55, 65, and 75 are changed in accordance with measurement postures, and urging forces individually adjusted for each slider 51, 61, and 71 are added, so that load change of each motor 53, 63, and 73 accompanied by posture change can be suppressed to zero or extremely small amount. Accordingly, drive performance of the motor independent of measurement postures can be exhibited, and the measuring head capable of taking any measurement posture without deteriorating its performance and function can be provided.

(2) Use of measuring heads can be extended, for example measuring heads can be applied to the bridge-type CNC three-dimensional coordinate measuring machine 100 like FIG. 2.

(3) A degree of freedom of mounting postures of the measuring head 10 to the spindle 170 of the three-dimensional measuring machine 100 is increased.

(4) Mechanical components added to the measuring head 10 can be limited only to pneumatic cylinders 55, 65, and 75. There is almost no change in structure compared to a case when a spring in FIG. 7 is used, and it is easy to maintain a small sized measuring head.

Figure 4:
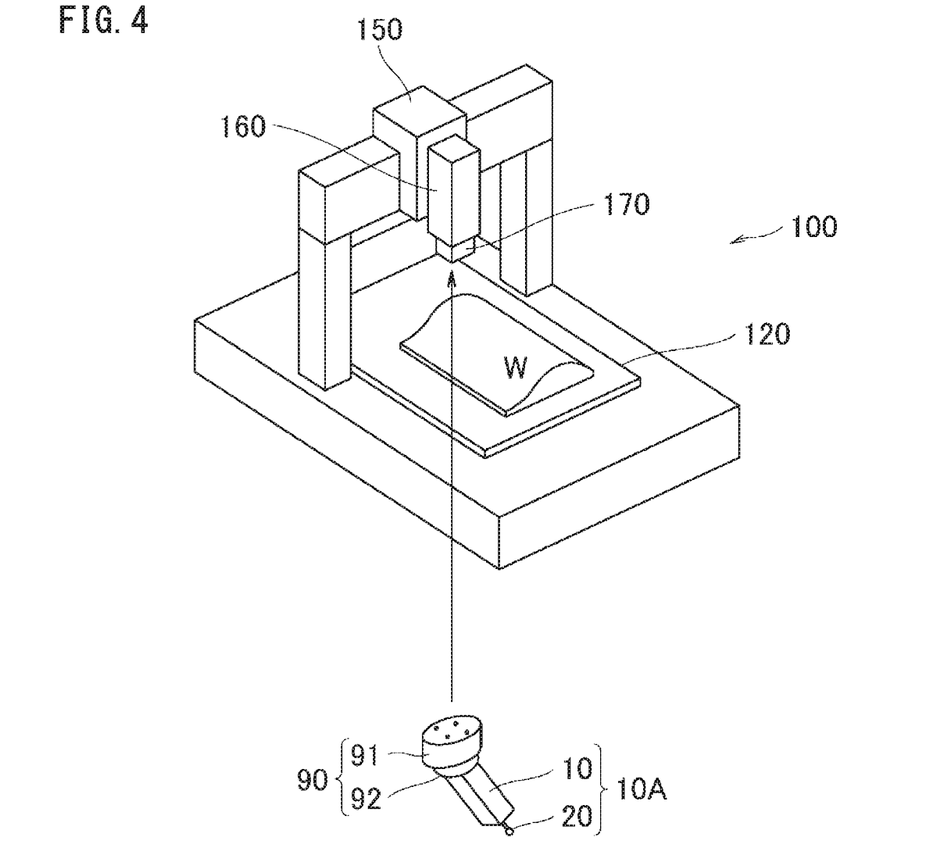
FIG. 4 shows a modified example of the use form.

A modified example of the measuring head according to the present embodiment is shown in FIG. 4. A posture changer 90 is further provided to the configuration of the measuring head 10, so that a self-posture changing function can be added to the measuring head 10A. The posture changer 90 in FIG. 4 is merely an example, and has a base part 91 detachable to the spindle 170 of the three-dimensional measuring machine 100, and a spherical part 92 held by the base part 91. The spherical part 92 is supported to be freely able to change the posture relative to the base part 91. The first guide 52 of the measuring head 10A may be fixed to such spherical part 92. That is, the mounting posture of the base part 91 relative to the spindle 170 does not have to be changed, and direction of the probe 20 can be freely changed within a movable range of the posture changer 90 after mounting.

In this modified embodiment, the posture changer 90 is provided between the spindle 170 of the three-dimensional measuring machine 100 and the first guide 52 of the measuring head 10. Further, the posture changer 90 in FIG. 4 may be provided between the third slider 71 and the probe 20 of the measuring head 10 shown in FIG. 1. However, in such configuration, the self-weight of the posture changer 90 acts on slider 51, 61, and 71 respectively. In other words, terminal mass of the measuring head 10 increases, which leads to lowering of natural frequency of the measuring head 10 and becomes an obstacle in acceleration of measuring. Therefore, the measuring head 10A of the modified example is superior.

Figure 5:
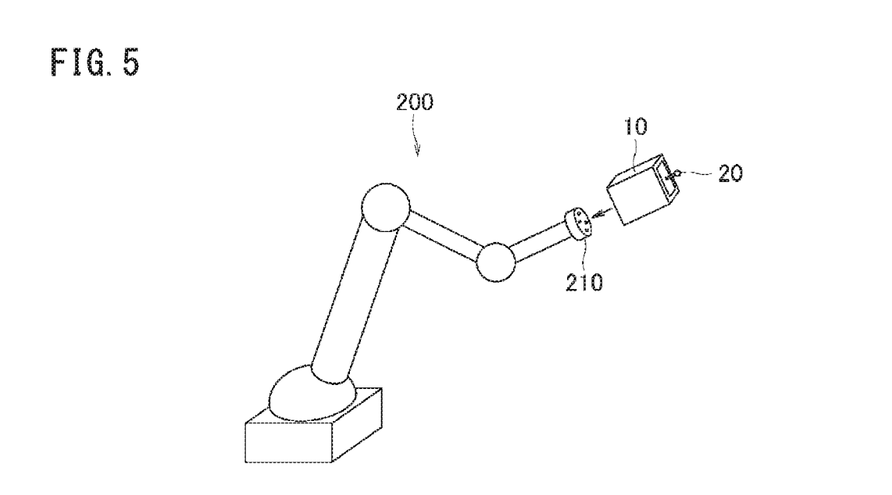
FIG. 5 shows an articulated three-dimensional measuring machine according to a second embodiment of the present invention.

Next, an articulated three-dimensional measuring machine according to a second embodiment of the present invention is describer with reference to the figures. FIG. 5 shows a three-dimensional measuring machine having the measuring head 10 of the above-described embodiment applied to an articulated moving device like a robot arm 200. The robot arm 200 can maintain desired position and posture of the measuring head 10, so that large products or parts being carried by a belt-conveyer, for example, can be measured at online in the state.

Figure 6:
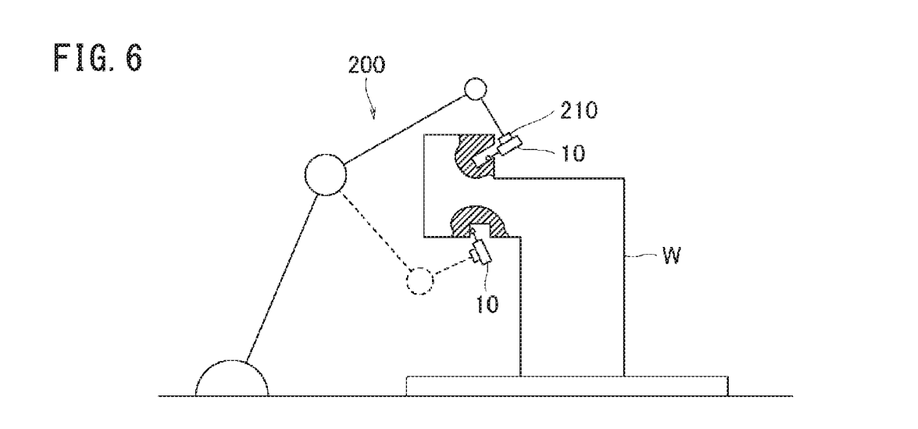
FIG. 6 shows an embodiment which uses the articulated three-dimensional measuring machine.

An example of measuring method by this articulated three-dimensional measuring machine is described with reference to FIG. 6.

The robot arm 200 takes the measuring head 10 hanged to an exchanging rack, not shown.

Then, the measuring head 10, kept in a state which is held a holding part 210 at the tip of the robot arm 200, is taken to a part to be measured of a processed work W on the belt conveyer and is kept in the desired posture.

Then, the control device 40 of the measuring head 10 detects the posture of the measuring head 10 by the posture detector 80 (FIG. 1), determines the flow paths of air supply to the pneumatic cylinders 55, 65, and 75 of each measurement axis in accordance with the posture, and adjusts air pressure. The control device 40 individually operates the measuring head 10 in such way, so that the robot arm 200 can measure surface properties of the part to be measured by the probe 20.

After measurement, the robot arm 200 may wait for next measuring command while holding the measuring head 10, or may return the measuring head 10 to the rack to proceed to other measurements or processes.

Use such as application of the measuring head 10 to the articulated three-dimensional measuring machine became possible. That is, the auxiliary mechanisms 54, 64, and 74 for the motor power which uses the pneumatic cylinders 55, 65, and 75 are provided to the measuring head 10, so that motor drive of the measuring head 10 becomes stable in any measurement posture. Therefore, when the measuring head 10 is mounted to the robot arm 200 which moves in a complicated manner like in the present embodiment, the probe driving device 30 of the measuring head 10 is hardly affected by gravity based on differences of measurement postures, and stable measurement of the measuring head 10 is achieved.

DESCRIPTION OF REFERENCE NUMBERS 10, 10A Measuring head
20 Probe
30 Probe driving device
40 Control device
50, 60, 70 First, second, and third slide mechanism
51, 61, 71 First, second, and third slider
52, 62 First, and second guide
53, 63, 73 First, second, and third motor
54, 64, 74 First, second, and third auxiliary mechanism
55, 65, 75 First, second, and third pneumatic cylinder (first, second, and third fluid pressure cylinder)
56, 66, 76 First, second, and third electromagnetic switching valve (first, second, and third flow path switcher)
57, 67, 77 First, second, and third automatic pressure regulator (first, second, and third fluid pressure changer)
80 Posture detector
100 Bridge-type three-dimensional measuring machine (moving device)
200 Robot arm (moving device)

The invention claimed is:
1. A measuring head comprising:
a first slide mechanism having a first slider, a first guide for guiding the first slider, and a first motor for driving the first slider for sliding along a first measurement axis;

a second slide mechanism having a second slider, a second guide fixed to the first slider for guiding the second slider, and a second motor for driving the second slider for sliding along a second measurement axis which is not parallel to the first measurement axis; and a probe held by the second slider for detecting a work;

making the probe to detect a work surface in accordance with the movement of the respective sliders; and being detachable to any external moving device via the first guide, wherein the first slide mechanism has a first fluid pressure cylinder connecting the first slider and the first guide and being extendable and contractible in the first measurement axis direction, and a first fluid pressure changer for changing pressure of fluid provided to the first fluid pressure cylinder in accordance with a measurement posture of the measuring head;

wherein the second slide mechanism has a second fluid pressure cylinder connecting the second slider and the second guide and being extendable and contractible in the second measurement axis direction, and a second fluid pressure changer for changing pressure of fluid provided to the second fluid pressure cylinder in accordance with a measurement posture of the measuring head.

2. The measuring head according to claim 1 further comprising a posture detector for detecting measurement postures of the measuring head, wherein each of the first and second fluid pressure changers changes pressure of the fluid based on posture information from the posture detector.

3. The measuring head according to claim 2, further comprising a third slide mechanism for a third measurement axis that is not parallel to the first and the second measurement axis provided between the second slider and the probe, wherein the third slide mechanism has a third slider for holding the probe, a third guide fixed to the second slider for guiding the third slider, a third motor for driving the third slider, a third fluid pressure cylinder connecting the third slider and the third guide and being extendable and contractible in the third measurement axis direction, and a third fluid pressure changer for changing pressure of the fluid provided to the third fluid pressure cylinder in accordance with the measurement posture of the measuring head.

4. The measuring head according to claim 1, further comprising a third slide mechanism for a third measurement axis that is not parallel to the first and the second measurement axis provided between the second slider and the probe, wherein the third slide mechanism has a third slider for holding the probe, a third guide fixed to the second slider for guiding the third slider, a third motor for driving the third slider, a third fluid pressure cylinder connecting the third slider and the third guide and being extendable and contractible in the third measurement axis direction, and a third fluid pressure changer for changing pressure of the fluid provided to the third fluid pressure cylinder in accordance with the measurement posture of the measuring head.

* * * * *